United States Patent
Tsunoda et al.

(10) Patent No.: US 6,919,511 B2
(45) Date of Patent: Jul. 19, 2005

(54) POWER SUPPLY APPARATUS WITH VIBRATION ABSORBING MEMBER FOR SLIDING STRUCTURE

(75) Inventors: Mitsunori Tsunoda, Shizuoka (JP); Kenichi Doshita, Shizuoka (JP); Kenichiro Kawaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 457 days.

(21) Appl. No.: 10/372,123

(22) Filed: Feb. 25, 2003

(65) Prior Publication Data
US 2003/0213608 A1 Nov. 20, 2003

(30) Foreign Application Priority Data

May 20, 2002 (JP) .................................. 2002-145245
Dec. 16, 2002 (JP) .................................. 2002-363996

(51) Int. Cl.[7] .............................. H02G 3/00; H01B 7/06
(52) U.S. Cl. ................... 174/72 A; 191/23 R; 296/155
(58) Field of Search ............................... 174/72 A, 69, 174/135, 136; 191/22 R, 23 R; 296/155, 149, 152

(56) References Cited

U.S. PATENT DOCUMENTS

| | | | | |
|---|---|---|---|---|
| 3,556,428 A | * | 1/1971 | Hayler et al. | 242/293 |
| 5,809,834 A | * | 9/1998 | Goldy | 296/155 |
| 5,826,811 A | * | 10/1998 | Melbye et al. | 242/345.2 |
| 6,065,707 A | * | 5/2000 | Sakata et al. | 242/388 |
| 6,089,492 A | * | 7/2000 | Nagata et al. | 242/374 |
| 6,196,488 B1 | * | 3/2001 | Sakata et al. | 242/388 |
| 6,286,890 B1 | * | 9/2001 | Faubert | 296/155 |
| 6,328,243 B1 | * | 12/2001 | Yamamoto | 242/378.1 |
| 6,492,592 B1 | * | 12/2002 | Murofushi et al. | 174/72 A |
| 6,515,229 B2 | * | 2/2003 | Aoki et al. | 174/72 A |
| 6,566,603 B2 | * | 5/2003 | Doshita et al. | 174/72 A |
| 6,570,093 B2 | * | 5/2003 | Doshita et al. | 174/72 A |
| 6,575,760 B2 | * | 6/2003 | Doshita et al. | 174/72 A |

* cited by examiner

Primary Examiner—Dean A. Reichard
Assistant Examiner—Adolfo Nino
(74) Attorney, Agent, or Firm—Armstrong, Kratz, Quintos, Hanson & Brooks, LLP

(57) ABSTRACT

A power supply apparatus for a sliding structure includes a wire harness 10 which is extended from a body 5 to a sliding structure, an elastic member 40 for urging the wire harness 10 in a warp absorbing direction, a harness supporting member 50₁ mounted on the elastic member, on which the wire harness 10 is placed, a curved portion protection member 70 which accommodates a curved portion 12 of the wire harness 10 at an intermediate position in a longitudinal direction thereof, and an unusual sound suppressing portion 511, 512 for preventing unusual sound from being generated when the harness supporting member 501 hits against the curved portion protecting member 70. As the unusual sound suppressing portion, projections 511 and 512 to be in contact with the curved portion protecting member 70 are attached to the harness supporting member 50₁. Because of the above configuration, even when vibration is applied to an engine or car body, unusual sound will not be generated.

19 Claims, 15 Drawing Sheets

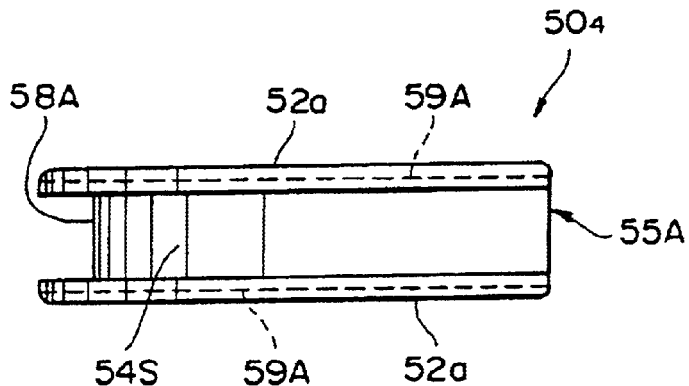
F I G. 1 0 A
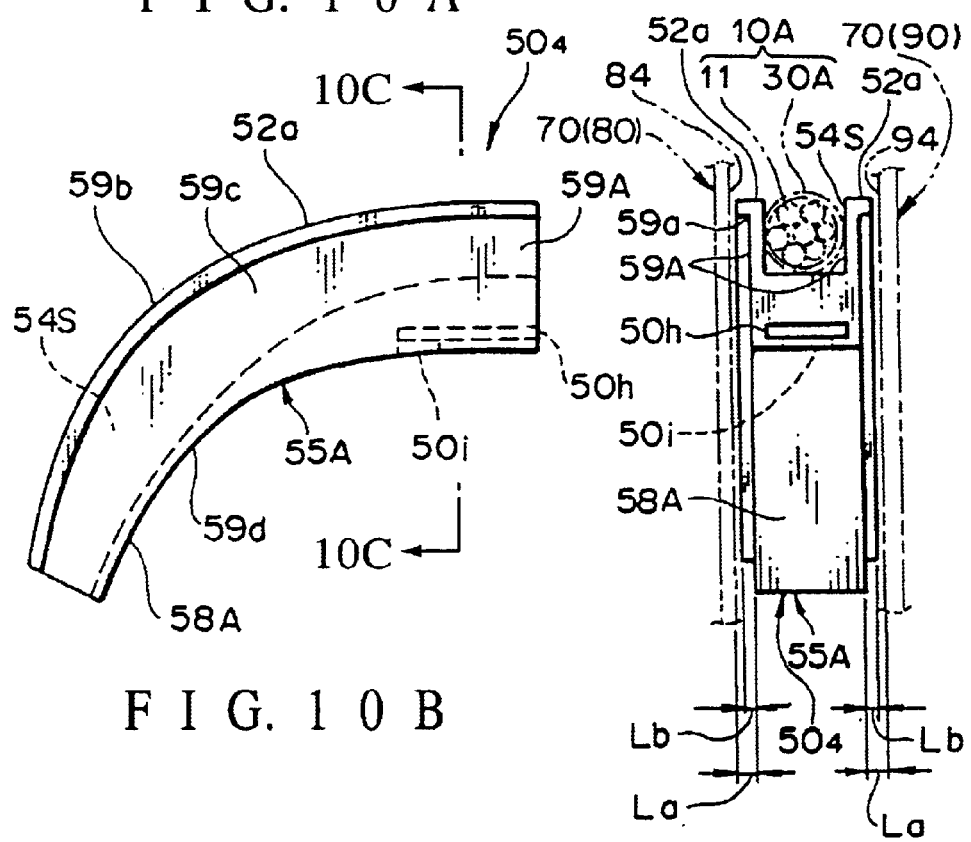
F I G. 1 0 B
F I G. 1 0 C

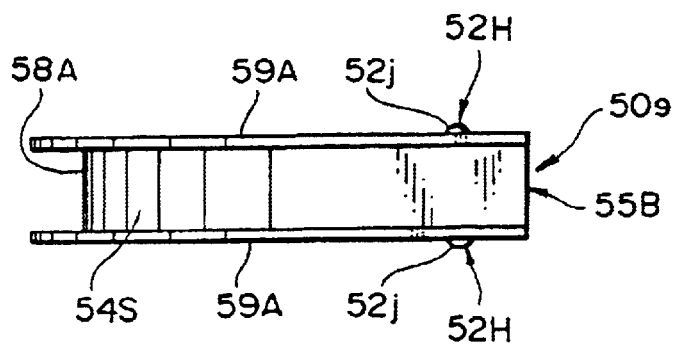
FIG. 15A
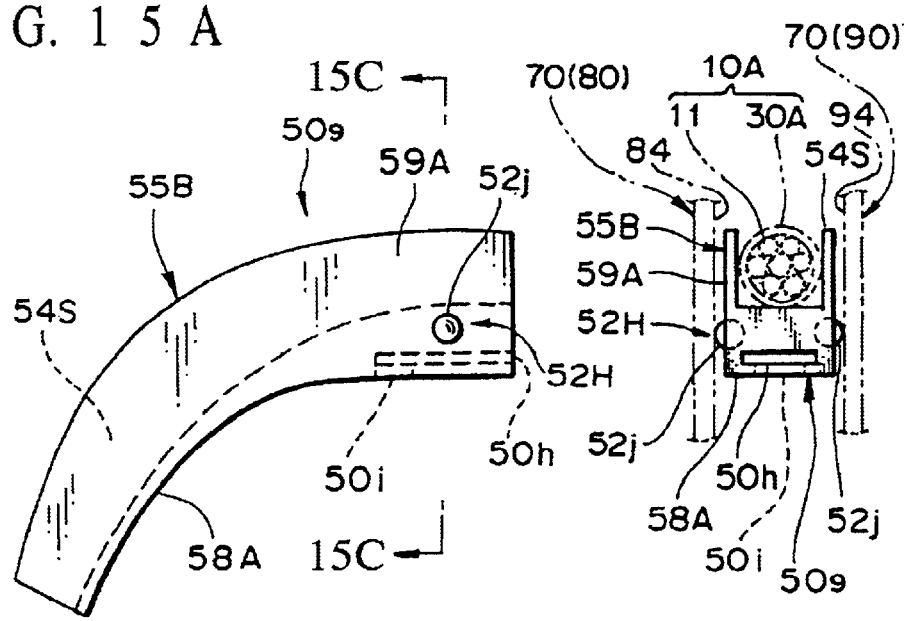
FIG. 15B
FIG. 15C
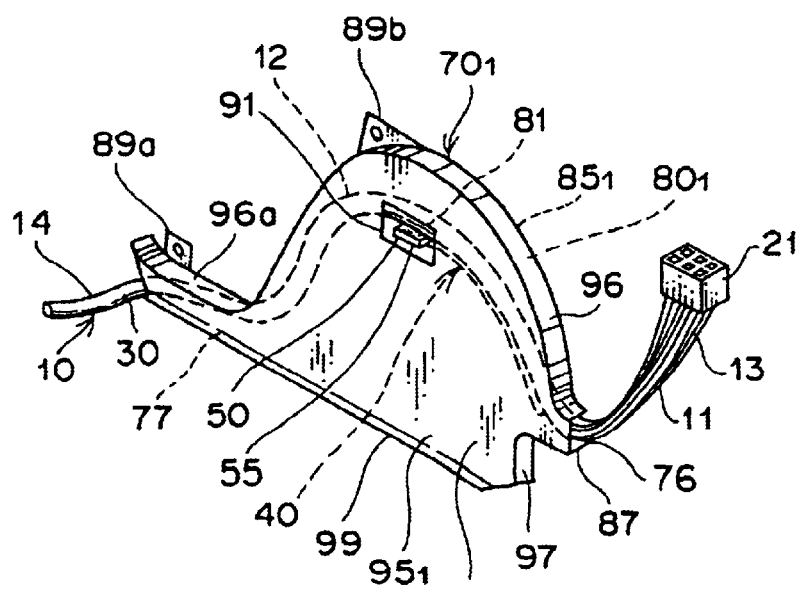
FIG. 25

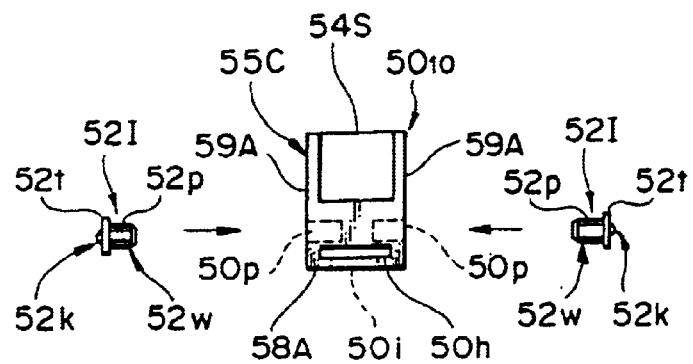
FIG. 17
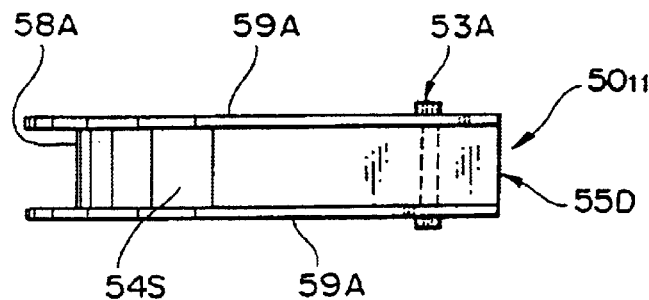
FIG. 19A
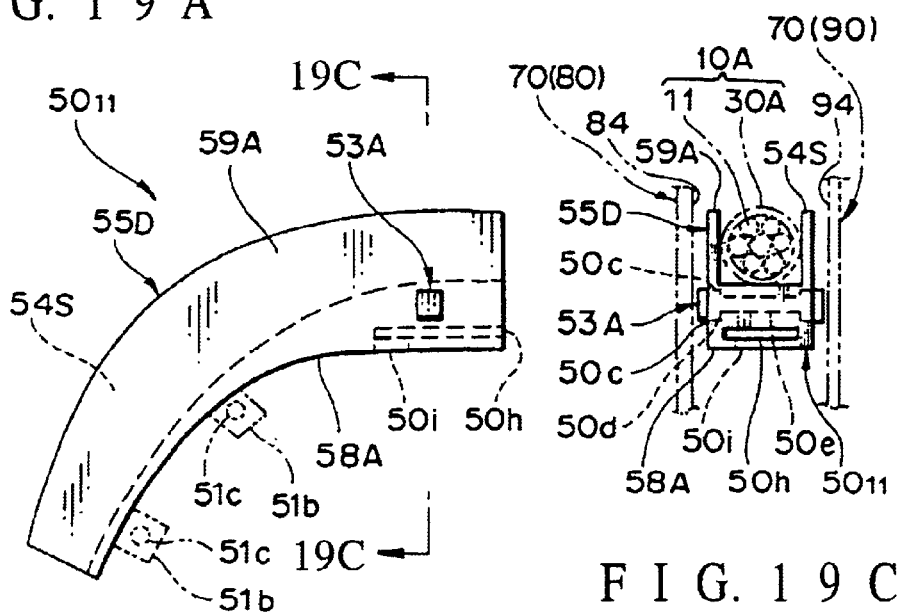
FIG. 19B
FIG. 19C

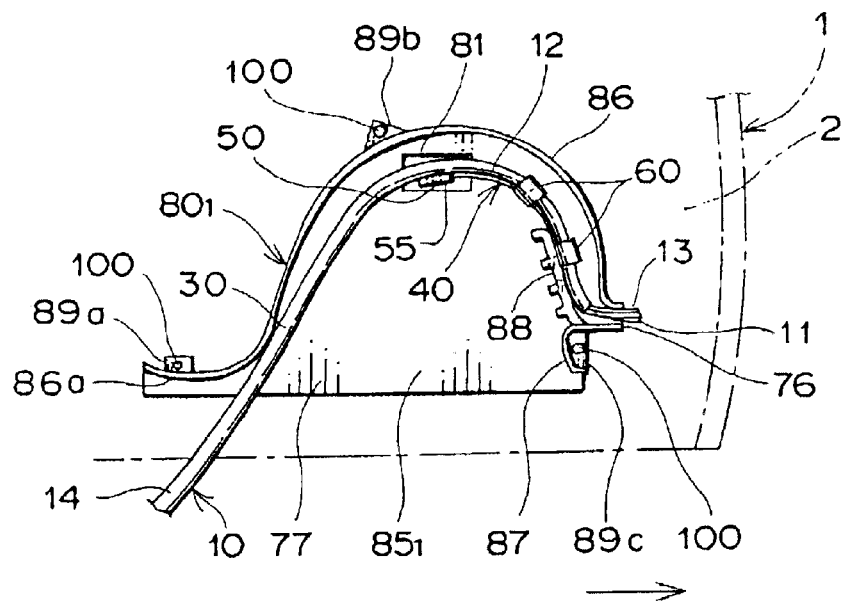
F I G. 2 4 A
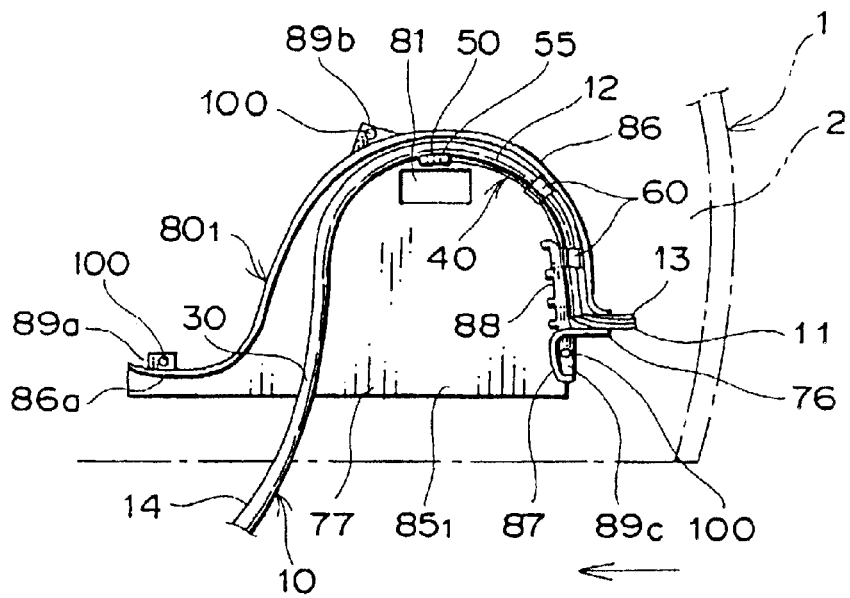
F I G. 2 4 B

POWER SUPPLY APPARATUS WITH VIBRATION ABSORBING MEMBER FOR SLIDING STRUCTURE

BACKGROUND OF THE INVENTION

1. Field of the Invention

This invention relates to a power supply apparatus for a sliding structure such as a slide door of a motor vehicle which serves to supply power from a car body to the slide door through a wire harness.

2. Description of the Related Art

In recent years, there is a tendency that the slide door has been adopted in a large number of motor vehicles.

The slide door refers to a door which can be opened in such a way that it is slid rearwards along the car body of a motor vehicle such as "one box wagon", "delivery van", etc. The application of the slide door to the motor vehicle provides an advantage that the opening of the car body is widened and hence getting-on/off can be conveniently done in a small space on the side of the car body.

Further, the slide door for e.g. one-boxcar incorporates functional components various kinds of electric instruments such as a power window motor, a switch unit for a motor operation, a window clipping preventing sensor and an auxiliary module.

In order to supply a power source current and a signal current to these functional components, a wire harness is extended from the car body (battery side) to the slide door. The wire harness is connected to each of the functional components in the slide door. Power supply to each of the functional components must be always carried out irrespectively of the opening/closing state of the slide door.

The wire harness on the door side which is arranged in the slide door of the motor vehicle is moved within the slide door when the slide door is opened/closed. Therefore, the wire harness with a redundant length is arranged.

However, in the conventional slide door of a motor vehicle, while the motor vehicle runs, owing to vibration produced from an engine or car body, the wire harness as well as the various kinds of components connected to the wire harness or arranged in the vicinity of the wire harness is vibrated. In this case, the respective components interfere with one another so that hitting sound or unusual sound may be generated.

SUMMARY OF THE INVENTION

An object of this invention is to provide a power supply apparatus for a sliding structure such as a slide door of a motor vehicle, which supplies electric power from a car body to the slide door through a wire harness, wherein hitting sound or unusual sound is not generated even when vibration is applied from an engine or car body.

In order to attain the above object, in accordance with this invention, there is provided a power supply apparatus for a sliding structure comprising:

a wire harness extended from a main body to a sliding structure;

an elastic member for urging the wire harness in a warp absorbing direction;

a harness supporting member mounted on the elastic member, on which the wire harness is placed;

a curved portion protecting member which movably accommodates a curved portion of the wire harness at an intermediate position in the longitudinal direction thereof; and an unusual sound suppressing portion for suppressing unusual sound generated when the harness supporting member hits against the curved portion protecting member.

In this configuration, even when vibration is applied to the main body to which the power supply apparatus is attached or the sliding structure, the unusual sound suppressing portion can suppress the generation of the unusual sound.

In a preferred embodiment, the harness supporting member is provided with a projecting portion to be in contact with the curved portion protecting member, the projecting portion serving as the unusual sound suppressing portion.

In this configuration, even when vibration is applied to the main body to which the power supply apparatus is attached or the sliding structure, the projecting portion can avoid the generation of the unusual sound.

In a preferred embodiment, the projecting portion is composed of flexible blades which are projected from both ends of the harness supporting member.

In this configuration, when vibration is applied to the main body to which the power supply apparatus is attached or the sliding structure, the flexible blades relaxes the vibration. In addition, the flexible blades suppress unusual sound generated when the harness supporting member hits against the curved portion protecting member.

In a preferred embodiment of this invention, the projecting portion is composed of ribs projected from both sides of the harness supporting member. In this configuration, the ribs suppress unusual sound generated when the harness supporting member hits against the curved portion protecting member.

In a preferred embodiment of this invention, the elastic member is provided with a projecting portion to be in contact with the curved portion protecting member, the projecting portion serving as the unusual sound suppressing portion.

In this configuration, the projecting portion suppresses unusual sound generated when the harness supporting member hits against the curved portion protecting member.

In a preferred embodiment of this invention, the ribs are not in contact with the curved portion protecting member in a state where no vibration is applied to the power supply apparatus.

In this configuration, when the harness supporting member hits against the curved portion protecting portion as a result of application of vibration to the wire harness, the ribs first hit against the curved portion protecting portion. This suppresses the generation of loud sound or hitting sound from the power supply apparatus.

In a preferred embodiment, the unusual sound suppressing portion is composed of a ball portion which is to be brought in contact with the curved portion protecting member and an urging member for urging the ball portion toward the curved portion protecting member.

In this configuration, when the harness supporting member hits against the curved portion protecting portion as a result of application of vibration to the wire harness, the urging member absorbs the vibration, thereby suppressing the generation of loud sound or hitting sound from the power supply apparatus.

In a preferred embodiment, the unusual sound suppressing portion is covered with an applied material with adhesiveness.

In this configuration, when the harness supporting member hits against the curved portion protecting portion as a result of application of vibration to the wire harness, the applied material with adhesiveness suppresses the generation of loud sound or hitting sound from the power supply apparatus.

In a preferred embodiment of this invention, a soft member to hit against the curved portion protecting member is attached to the elastic member, the soft material serving as the unusual sound suppressing portion.

In this configuration, the soft material suppresses unusual sound generated when the harness supporting member hits against the curved portion protecting member. The soft member can be accurately formed by applying a soft material such as a tape to the elastic member.

In a preferred embodiment of this invention, a soft member to hit against the curved portion protecting member is attached to the wire harness, the soft material serving as the unusual sound suppressing portion.

In this configuration, the soft material suppresses unusual sound generated when the harness supporting member hits against the curved portion protecting member.

In a preferred embodiment of this invention, an unusual sound absorbing member to hit against the curved portion protecting member is attached to the harness supporting member, the unusual sound absorbing member serving as the unusual sound suppressing portion.

In this configuration, the unusual sound absorbing member suppresses unusual sound generated when the harness supporting member hits against the curved portion protecting member. When the harness supporting member hits against the curved portion protecting portion as a result of application of vibration to the wire harness, the unusual sound absorbing member made of e.g. rubber, non-woven tape, felt, etc. absorbs the vibration, thereby suppressing the generation of loud sound or hitting sound from the power supply apparatus.

In a preferred embodiment, the harness supporting member has an attaching hole to which the unusual sound absorbing member is inserted. Therefore, the unusual sound absorbing member can be easily attached to the harness supporting member by a simple operation.

In a preferred embodiment, each of the inlets of the attaching hole substantially corresponds to the external shape of the unusual sound absorbing member, and the central portion of the attaching hole has a smaller size than that of the outer size of the unusual sound absorbing member.

In this configuration, the unusual sound absorbing member is pressed into the central portion of the attaching hole so that it can be surely held by the harness supporting member.

In a preferred embodiment of this invention, a plurality of unusual sound absorbing members are attached to the harness supporting member.

In this configuration, the plurality of unusual sound absorbing members surely suppress unusual sound generated when the harness supporting member hits against the curved portion protecting member as a result of application of sever vibration to the curved portion protecting portion and harness supporting member.

In a preferred embodiment, the width of a body of the harness supporting member is shorter than the longer diameter of the wire harness which is elliptical in section so that the one end of the wire harness in the longitudinal direction and the other end thereof serve as unusual sound suppressing portions; and in a state where the sliding structure is closed for a the main body, the wire harness is twisted so that the wire harness placed on the body of the harness supporting member is tilted and then the one and other ends of the wire harness are brought into contact with substrates of the curved portion protecting member.

In this configuration, using that the wire harness elliptical in section is twisted when the sliding structure is closed for a the main body, the wire harness placed on the body of the harness supporting member is tilted so that the one and other ends of the wire harness are brought into contact with substrates of the curved portion protecting member.

In this state, since the width of a body of the harness supporting member is shorter than the longer diameter of the wire harness, generation of the unusual sound is suppressed when the body of the harness supporting member hits against the curved portion protecting member.

In a preferred embodiment, the unusual sound suppressing portion which corresponds to the harness supporting member is formed on each substrate of the curved portion protecting member so as to serve as a relief portion which avoids contact with the harness supporting member.

In this configuration, the relief portion suppresses unusual sound generated when the harness supporting member hits against the curved portion protecting member.

In a preferred embodiment of this invention, the relief portion is a through-hole formed in each substrate. In this configuration, because of the provision of the through-hole, the harness supporting member will not hit against the curved portion protecting member.

In a preferred embodiment of this invention, the relief portion is a concave portion or relief groove formed on each substrate. In this configuration, the concave portion or relief groove suppresses unusual sound generated when the harness supporting member hits against the curved portion protecting member.

In a preferred embodiment of this invention, in place of the relief portion, a projection to be in contact with the harness supporting member is attached to each substrate of the curved portion protecting portion. In this configuration, the harness supporting member is fit in the projection so that the generation of the unusual sound is suppressed.

The above and other objects and features of this invention will be more apparent from the following description taken in conjunction with the accompanying drawings.

BRIEF DESCRIPTION OF THE DRAWINGS

FIGS. 10A, 10B and 10C are a plan view of a harness supporting member used in a fifth embodiment of this invention, a side view thereof and an explanation view, respectively;

FIGS. 15A, 15B and 15C are a plan view of a harness supporting member used in a tenth embodiment of this invention, a side view thereof and an explanation view, respectively;

FIG. 17 is an explanation view of a harness supporting member used in an eleventh embodiment of this invention;

FIGS. 19A, 19B and 19C are a plan view of a harness supporting member used in a twelfth embodiment of this invention, a side view thereof and an explanation view thereof, respectively;

FIGS. 24A and 24B are a front view showing the state when the sliding structure is closed for a car body and a front view showing the state when a sliding structure is opened for the car body in a power supply apparatus for the sliding structure according to a fifteenth embodiment;

FIG. 25 is a perspective view of a power supply apparatus for a sliding structure shown in FIGS. 24A and 24B;

DESCRIPTION OF THE PREFERRED EMBODIMENTS

Figure 1:
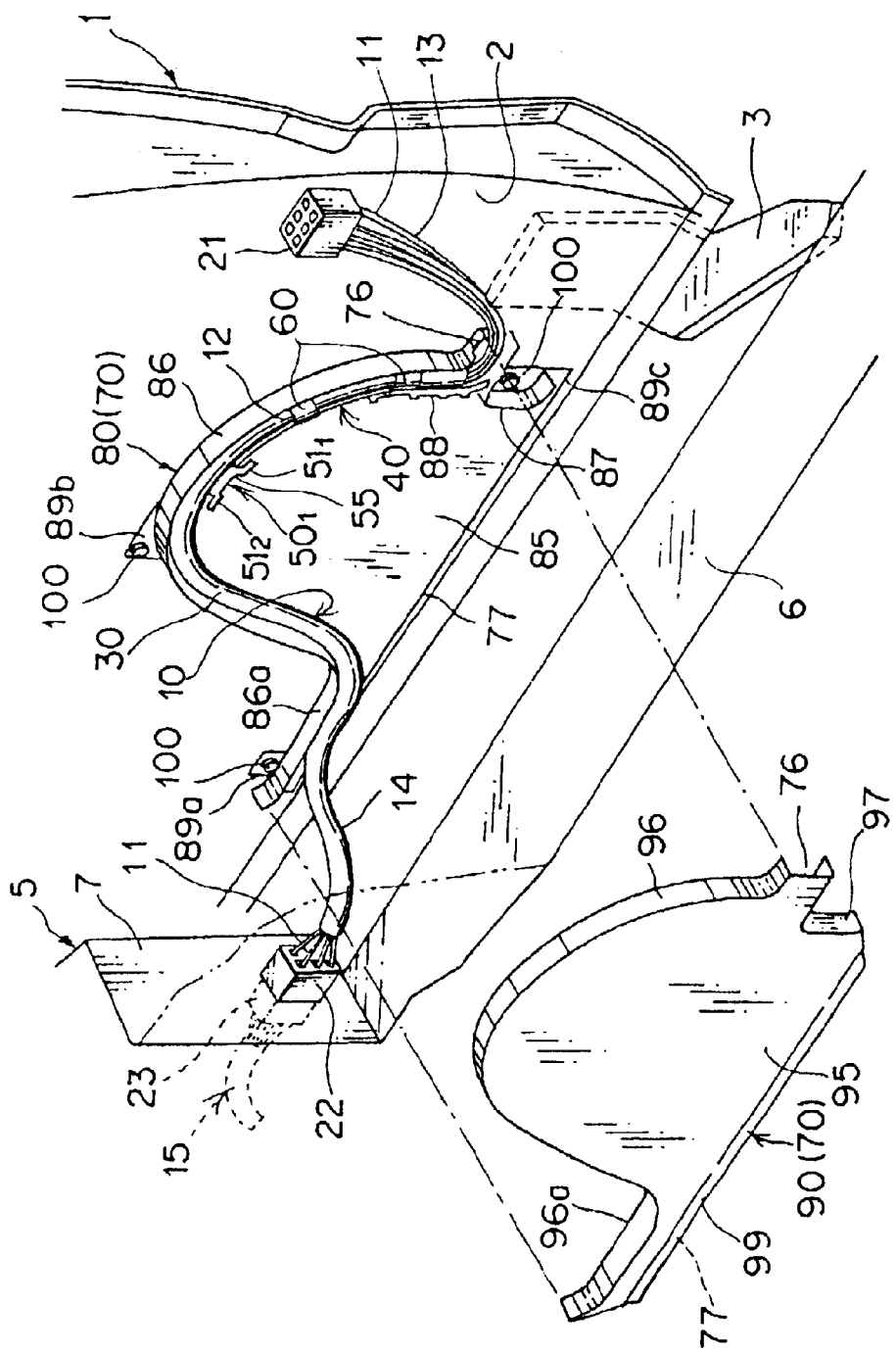
FIG. 1 is an exploded perspective view of a first embodiment of a power supply apparatus for a sliding structure according to this invention.

Now referring to the drawings, an explanation will be given of various embodiments of this invention.

FIG. 1 is an exploded perspective view of an embodiment of a power supply apparatus for a sliding structure according to this invention.

In FIG. 1, the respective directions of the power supply apparatus will be defined as follows. The direction of "front/rear" is defined as the "front" being the side of a first harness inlet 76 when a protector 70 is arranged, and the "rear" being the side of an attachment flange 89a for a protector body 80. The direction of "upper/lower" is defined as the "upper" being the side of an attachment flange 89b for the protector body 80 and the "lower" being the side of a second harness inlet 77 when a protector 70 is arranged. Also, in various embodiments illustrated in FIGS. 22 and 24 to 26, the above definitions are applied. Incidentally, the directions of "front/rear" and "upper/lower" in this specification are defined for the sake of convenience, and do not necessarily coincide with the directions when the power supply apparatus for the sliding structure is actually employed.

In FIG. 1, in a slide door 1 which is employed in e.g. a one-box car or some passenger cars, a door-side wire harness 10 is arranged which can supply power to various kinds of auxiliary machines such as a power window motor, door lock unit, speaker, etc. The door side wire harness 10 is extended over the slide door 1 and a car body 5. The one end thereof 13 is connected to the above various auxiliary machines (not shown) through a connector 21 (only one is illustrated, but two or more connectors may be actually employed). In FIG. 1, although a single connector 21 is attached to the wire harness 10 at the one end 13 is shown, two or more connectors may be attached to the wire harness 10.

The other end 14 of the door side wire harness 10 is connected to a connector 23 of a car body side wire harness 15 through another connector 22. The door side wire harness 10 as well as the protector 70, attached to an inner panel 2 of the slide door 1, is arranged in the slide door 1. In this embodiment, the protector 70 constitutes the power supply apparatus. Using the door side wire harness 10 and the protector 70 simplifies the structure of the power supply apparatus, saves the occupied space and improves assembling capability.

The slide door 1 is slidably attached to the car body 5. The slide door is slid in the longitudinal direction of the car body 5. Specifically, where the slide door 1 is opened for the car body 5, the slide door 1 is once pulled out toward the side of the side of the car body and slid along the car body 5. Where the slide door 1 is closed for the car body 5, the operation reverse to the above operation is carried out.

An inner panel 2 is provided inside the car body 5 of the slide door 1. At the lower end of the slide door 1, a hinge roller attaching piece 3 which is slidably engaged with a rail (not shown) is attached to the lower end of the car body 5.

The car body 5 is provided with a step 6 at a position where the slide door 1 is closed. Inside an upright wall 7 of the step 6, a connector 23 of the car body side wire harness 15 is arranged. The connector 22 of the door side wire harness 10 and the connector 23 of the car body side wire harness 15 are connector-connected to each other inside the upright wall 7. The door side wire harness 15 is directly or indirectly connected to a battery (not shown).

The door side wire harness 10 is formed as a bundle of a plurality of electric wires 11. The one end 13 thereof is connected to the connector 21 whereas the other end 14 thereof is connected to the connector 22. The door side wire harness 10 is covered with a flexible tube member 30, e.g. corrugated tube 30.

The corrugated tube 30 serves to protect the door side wire harness 10 which is derived from the protector 70 toward the car body 5. The corrugated tube 30 may be mounted or not over the door side wire harness 10. The tube member 30 may be optionally attached to the door side wire harness 10. An adhesive tape may be wound over the plurality of electric wires 11 to constitute the door wire harness.

An elastic member 40 which presses the door side wire harness 10 is attached to a protector body 80 so that it extends along the corrugated tube 30 which constitutes the door side wire harness. The corrugated tube 30 and the elastic member 40 are fixed using a ring-shaped fixing member 60 or adhesive tape (not shown). Some slide doors can omit the fixing member 60 according to their specification.

The elastic member 40, which is formed of an elastic thin strip-like plate, upwards urges the curved portion 12 of the door side wire harness 10 so that it springs up. The elastic member 40 is arranged to extend along the curved portion 12 of the door side wire harness 10 from the vicinity of the first harness inlet 76 of the protector 70.

The one end of the elastic member 40 is located at the intermediate portion of the curved portion 12 of the door side wire harness 10. A flat spring cap $50_1$ for supporting the wire harness is attached to the upper tip of the elastic member 40. In this embodiment, the elastic member 40 is formed of a thin steel sheet, but may be made of a metallic material or synthetic resin.

The curved portion 12 of the door side wire harness 10 is formed by curving the intermediate portion of the door side wire harness 10 covered with the corrugated tube 30. The curved portion 12 is formed so that it is accommodated in the protector 70. The curved portion 12 causes the elastic member 40 in contact with the door side wire harness 10 to generate urging force. The curved portion 12, when urged by the elastic member 40, is brought into contact with the curved portion of a limiting wall 86 of the protector body 80. The curved portion 12 of the door side wire harness 10 is arranged so that it is movable in parallel to the inner panel 2 within the protector 70

The protector 70 includes the protector body 80 secured to the inner panel 2 and a cover 90 which is to be engaged with the protector body 80. Otherwise, the protector 70 may be an unitary protector (not shown) composed of two substrates 85 and 95. The protector 70 is minimized in size in view of the movable range of the curved portion 12 of the door side wire harness 10. The protector body 80 and the cover 90 are formed of synthetic resin by injection molding. However, they may be formed by press-cutting a metallic plate.

The protector body 80 includes a semi-circular substrate 85 in contact with the inner panel 2, a curved limiting wall 86 which is upright at the edge of the substrate 85, a base wall 87 opposite to the one end of the limiting wall 86 and a fixed wall 88 for fixing the wire harness which is opposite to the limiting wall 86. The one end of the protector body 80 corresponds to the first harness inlet 76.

The limiting wall 86 serves to limit the position of the curved portion 12 of the door side wire harness 10 urged by the elastic member 40. In this embodiment, the limiting wall 86 is formed in an arc shape which is oriented upward. The limiting wall 86 has an extending portion 86a which extends from the arc shape portion of the limiting wall 86 straight rearward of the slide door 1. The extending portion 86a of the limiting wall 86 is located at the other end of the protector body 80.

When the slide door 1 is opened/closed for the car body 5, the door side wire harness 10 interferes with a bolt 100 for attaching the inner panel of the protector body 80 so that the door side wire harness 10 may be adversely affected. In order to avoid such inconvenience previously, flanges 89a and 89b are formed at the outer edges of the extending portion 86a and the arc shape portion of the limiting wall 86, respectively. The protector body 80 is secured to the inner panel 2 by tightening the bolts 100 through the flanges 89a and 89b. Further, the bolt 100 is also tightened for the flange 89c in the vicinity of the base wall 87 so that the protector body 80 is surely secured to the inner panel 2.

The cover 90 includes a cover-side substrate 95 opposite to the substrate 85 of the protector body 80, a curved peripheral wall 96 which extends along the limiting wall 86 of the protector body 80, and a short side wall 97 corresponding to the protector body 80. The one end of the cover 90 inclusive of the peripheral wall 96 and side wall 97 corresponds to the first harness inlet 76 when the protector 70 is structured. The arc portion of the peripheral wall 96 is communicated with an extended portion 96a which extends straight rearward of the slide door 1. The other end of the cover 90 is located at the extended portion 96a.

At the lower edge of the substrate 95, a flange 99 which projects outward from the cover 90 is formed. The flange 99 has a curve (not shown) at the base. The door side wire harness 10 derived from the second harness inlet 77 of the protector 70 is brought into contact the curve through the corrugated tube 30.

Since the base of the flange 99 is curved, when the slide door 1 is opened/closed for the car body 5, the door side wire harness 10 will not be rubbed by the edge portion of the substrate 95.

Therefore, when the slide door 1 is opened/closed for the car body 5, the door side wire harness 10 is moved smoothly. This avoids inconvenience that the door side wire harness 10 is damaged so that the durability of the door side wire can be improved.

The door side wire harness 10 is curved downward along the flange 99 having the curve so that the door side wire harness 10 and a lower end of the door trim (not shown) of the slide door 1 do not interfere with each other. In this state, the door side wire harness 10 is derived from the protector 70 toward the car body 5. Therefore, the rubbing of the door side wire harness 10 by the lower end of the door trim (not shown) is prevented.

The cover 90 can be attached to the protector body 80 from the side of the car body 5 using various kinds of attaching means. For example, an engaging portion (not shown) is formed on the outer surface of the limiting wall 86 of the protector body 80 and another engaging portion (not shown) is formed on the outer surface of the cover 90 so as to correspond to the above engaging portion. The above two engaging portions are engaged with each other to mount the cover 90 in the protector body 80. Thus, the cover 90 can be mounted in the protector 80 easily and quickly.

In the state where the slide door 1 is opened or closed for the car body 5, the arranged state of the door side wire harness 10 accommodated in the protector 70 and the location of the curved portion 12 of the door side wire harness 10 can be optionally determined according to the specifications of the car body 5 and the slide door 1. In various embodiments illustrated in FIGS. 2 to 28, like reference numerals refer to like elements of FIG. 1.

The power supply apparatus for a sliding structure according to an embodiment of this invention includes the door side wire harness 10 which is extended from the upright wall 7 of the car body 5 to the slide door 1; metallic member 40 for urging the door side wire harness 10 in a warp absorbing direction; flat spring cap 50 (FIGS. 8, 22 to 28), $50_1$–$50_{12}$ (FIGS. 1 to 7, FIGS. 9–17, FIGS. 19 to 21) of synthetic resin, which is placed on the upper tip of the elastic member 40; protector 70 (FIGS. 1, 10, 15, 19), $70_1$ to $70_3$ (FIGS. 25, 27, 28) of synthetic resin which accommodates the curved portion 12 of the door side wire harness 10 at the intermediate position in the longitudinal direction so that the curved portion is movable in parallel to the slide door 1; and a portion for preventing unusual sound from being generated. Incidentally, the unusual sound will be generated as follows. While a motor vehicle runs, the entire motor vehicle suffers from vibration. Owing to this vibration, the flat spring cap 50, $50_1$–$50_{12}$ repeatedly hits against the protector 70, $70_1$ to $70_3$ so that the unusual sound will be generated.

As shown in FIG. 1, it should be noted that the metallic elastic member 40 upwards urges the door side wire harness 10. The unusual sound suppressing portions are denoted by reference numerals 18, 19 (FIG. 23), 45 (FIG. 8), 51, $51_2$ (FIGS. 1 to 4), 52 (FIGS. 5 to 7), 52a to 52e (FIGS. 10 to 14), 52H (FIGS. 15, 16), 52I (FIGS. 17, 18), 53 (FIG. 9), 53A (FIGS. 19, 20), 53B (FIG. 21), 81 to 83 (FIGS. 24 to 28), and 91 to 93 (FIGS. 25, 27, 28).

For example, even when the above vibration is applied to the car body 5 or slide door 1, since the power supply apparatus for the sliding structure is provided with the unusual sound suppressing portions, the unusual sound can be prevented from being generated.

As seen from FIGS. 1 to 7, a supporting body 55 which is made of synthetic resin is provided with projections $51_1$, $51_2$, 52 of synthetic resin which serves as the unusual sound suppressing portions $51_1$, $51_2$, 52. These projections $51_1$, $51_2$, 52 maybe formed integrally to or separately from the supporting body 55.

Since the supporting body 55 is provided with the projections $51_1$, $51_2$, 52 which are in contact with the substrate 85 of the protector body (FIG. 1) and the substrate 95 of the cover 90 (FIG. 1), the unusual sound is prevented from being generated when the supporting body 55 hits against the substrates 85 and 95.

Embodiment 1

Figure 2:
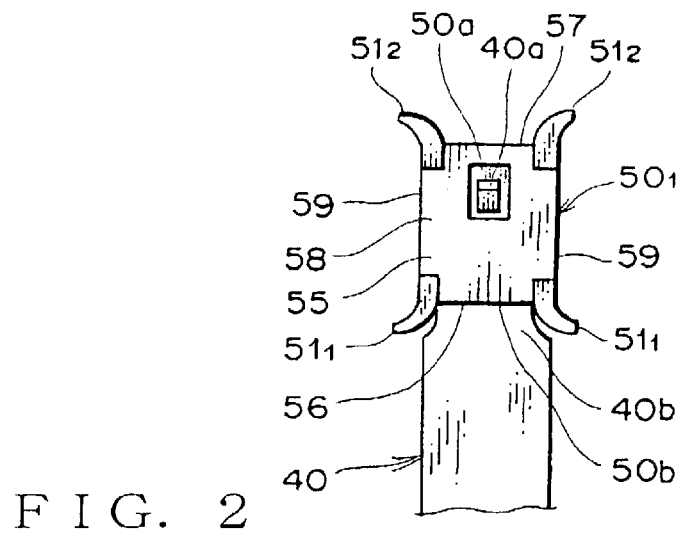
FIG. 2 is a bottom view of a harness supporting member shown in FIG. 1.
Figure 3:
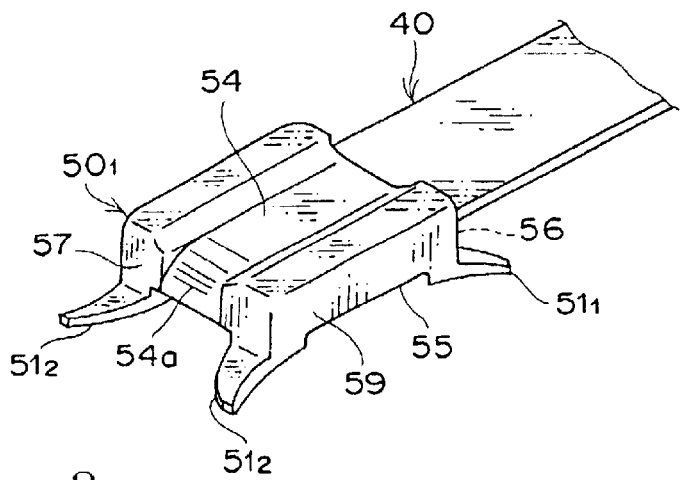
FIG. 3 is a perspective view of the harness supporting member in FIG. 1.
Figure 4:
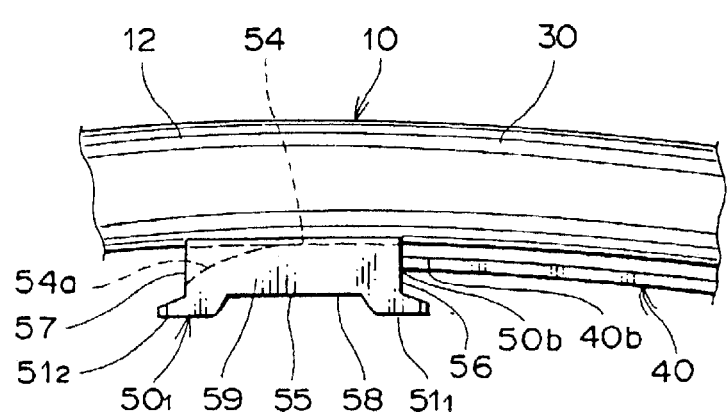
FIG. 4 is a front view of the harness supporting member shown in FIG. 1.

As seen from FIGS. 2 to 4, in a first embodiment of this invention, as the projections $51_1$, $51_2$, a pair of flexible blades $51_1$, $51_2$ are projected from the one end 56 and 57 and the other ends of the bottom 58, respectively. These flexible blades $51_1$, $51_2$ are projected outwardly from the supporting body 55 in a longitudinal or oblique direction. The flexible blades $51_1$ at the one end 56 are projected on both sides of an attaching portion 50b for attaching the supporting body 55 into which the elastic member 40 is inserted.

Since the flexible blades $51_1$, $51_2$ and the supporting body 55 which are made of the same material are integrally formed to each other, the vibration applied to the car body 5 or the slide door 1 can be relaxed by the flexible blades $51_1$, $51_2$.

Since the supporting body 55 is provided with the flexible blades $51_1$ and $51_2$ which is in contact with the substrates 85 and 95 (FIG. 1), the unusual sound is prevented from being generated when the supporting body 55 hits against the substrates 85 and 95.

Embodiment 2

Figure 5:
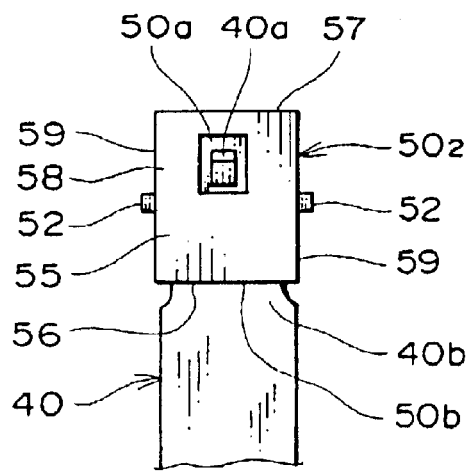
FIG. 5 is a bottom view of a harness supporting member used in a second embodiment of this invention.
Figure 6:
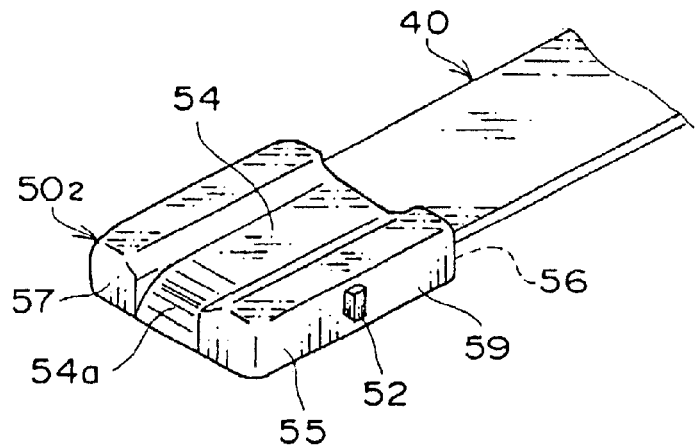
FIG. 6 is a perspective view of the harness supporting member in FIG. 5.
Figure 7:
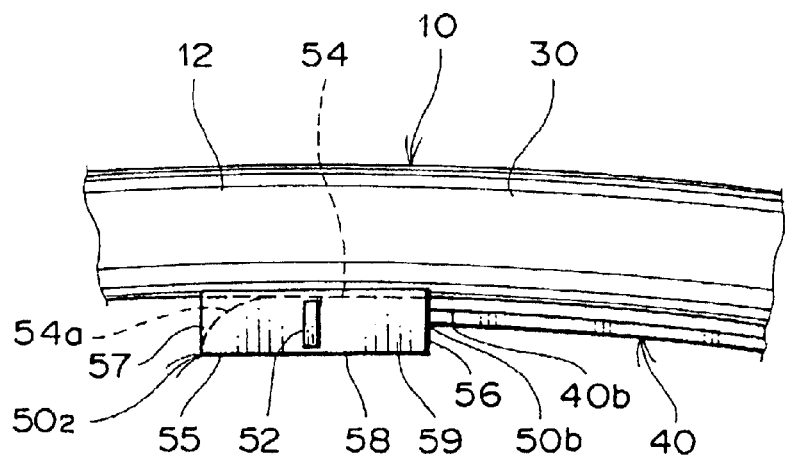
FIG. 7 is a front view of the harness supporting member in FIG. 5.

As seen from FIGS. 5 to 7, in a second embodiment of this invention, the above projections 52 are formed as ribs 52 which project from both sides of the supporting body 55 which constitutes a flat spring cap $50_2$. The ribs 52 are made of the same synthetic resin as that of the supporting body 55 and have a rectangular parallelepiped form. The ribs 52 are short in the longitudinal length of the supporting body 55 and vertically long in the longitudinal direction of the supporting body 55.

Since the pair of ribs 52 are projected outwardly from the centers of both sides 59 of the supporting body 55, the distance from the tip of the one rib 52 to that of the other rib 52 is longer than the width from the one side of the supporting body 55 to the other side thereof.

As seen from FIGS. 5 to 7, since the supporting body 55 is integrally provided with the ribs 52 which are in contact with the substrates 85 and 95, the unusual sound can be prevented from being generated when the supporting body 55 hits against the substrates 85 and 96. The ribs 52 which has a rectangular parallelepiped form are difficult to be chipped from the supporting body 55.

In place of using the flat spring caps $50_1$ and $50_2$ as described above, the elastic member 40 may be provided with the projections $51_1$, $51_2$, 52 (not shown). In this structure, since the elastic member 40 is provided with the projections $51_1$, $51_2$, 52 which are in contact with the substrates 85 and 95, the unusual sound can be prevented from being generated when the supporting body 55 hits against the substrates 85 and 95.

Embodiment 3

Figure 8:
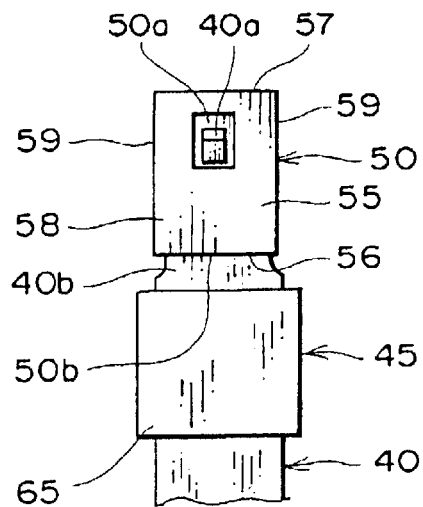
FIG. 8 is a bottom view of a harness supporting member used in a third embodiment of this invention.

As seen from FIG. 8, in the third embodiment of this invention, a soft material 65 which is a tape is wrapped around the elastic member 40. In this embodiment, a soft material portion is formed as the above unusual sound suppressing portion 45. Specifically, the tape 65 which is a lengthy non-woven tape is wrapped around the elastic member 40 which is metallic so that the soft material potion as the above unusual sound suppressing portion 45 is formed around the elastic member 40.

The soft material 65 should not be limited to the non-woven tape, but may be any flexible material. Further, the soft material 65 may be attached in a format other than that shown in FIG. 8. For example, the soft material 65 may be formed on the door side wire harness as well as the elastic member 40.

As shown in FIG. 8, the soft material portion 45 has a larger size than that of the supporting body 55. The soft material portion 45 thus formed is in contact with the substrates 85 and 95.

The soft material portion 45 serves to suppress the unusual sound generated when the supporting body 55 hits against the substrates 85 and 95. Incidentally, the non-woven tape is wrapped around the elastic member 40 so that the soft material portion 45 can be formed accurately.

Although not shown, the soft material portion 45 may be wrapped around the door side wire harness 10 instead of the elastic member 40 so that it has a larger size than that of the supporting body 55. In this case, the soft material portion 45 may extend to the convex portion 54. Further, the soft material portion 45 may be wrapped around both the door side wire harness 10 and the elastic member 40 so that it has a larger size than that of the supporting body 55.

The soft material portion 45 thus formed also prevents the unusual sound from being generated when the supporting body 55 hits against the substrates 85 and 95 as described above.

Embodiment 4

Figure 9:
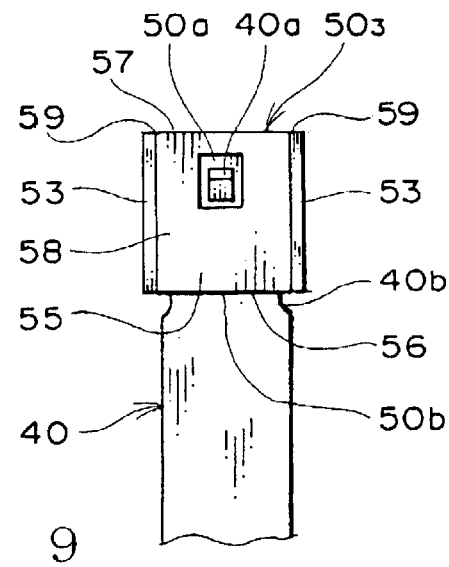
FIG. 9 is a bottom view of a harness supporting member used in a fourth embodiment of this invention.

As seen from FIG. 9, in a fourth embodiment of this invention, unusual sound absorbing materials 53 in contact with the substrates 85 and 95 are formed on both sides of the supporting body 55. The unusual sound absorbing material 53 is made of a soft material such as rubber, non-woven tape, or felt.

The unusual sound absorbing materials 53 may be formed by two-color molding when the supporting body 55 which constitutes a flat spring cap $50_3$ is molded. The unusual sound absorbing materials 53 may be applied to both sides of the supporting body 55 using adhesive.

The unusual sound absorbing materials 53 serve to suppress the unusual sound generated when the supporting body 55 hits against the substrates 85 and 95 as described above.

As seen from FIGS. 2, 5, 8 and 9, a flexible securing protrusion 40a which is made by press-working is formed in the vicinity of the end of the elastic member 40. An engagement hole 50a which is square is formed on the bottom 58 of the supporting body 55 so that the engagement hole 50a corresponds to the flexible securing protrusion 40a.

An attaching inlet 50b is formed at the one end 56 of the supporting body 55. An attaching portion 40b formed in the vicinity of the end of the elastic member 40 is inserted into the attaching inlet 50b. The securing protrusion 40a is engaged with the engagement hole 50a. Therefore, the flat spring cap can be surely mounted to the upper end of the elastic member 40.

As shown in FIGS. 3, 4, 6, 7 and 23, the curved concave portion 54 is formed on the upper side of the supporting body 55 so as to correspond to the outer surface of the door side harness 10.

At the other end 57 of the supporting body 55, the above curved concave portion 54 is gently bent toward the bottom 58 of the supporting body 55 to form a curved surface 54a. The curved surface 54a is provided to avoid the inconvenience that the door side wire harness 10 is bent at an acute angle and hence damaged.

Further, when the curved portion 12 of the door side wire harness 10 (FIG. 1) is vertically moved in the accommodating portion of the protector 70 in parallel to the inner panel 2, the unusual sound suppressing portions are denoted by reference numerals 18, 19 (FIG. 23), 51, $51_2$ (FIGS. 1 to 4), 52 (FIGS. 5 to 7), 45 (FIG. 8), 53 (FIG. 9), etc. are gently brought into slidable contact with the inner faces of the substrates and 85 and 95 (FIG. 1).

It should be noted that the sound generated when two components are hit against or slidably contact with each other is greater when both of them are made of a hard metallic material than that generated when at least one of the two components is made of a soft material such as synthetic resin, rubber, felt, non-woven cloth.

Figure 16:
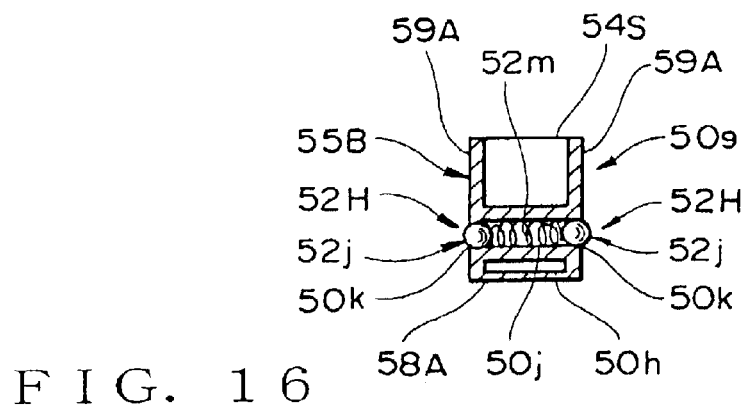
FIG. 16 is a sectional view taken in line I—I in FIG. 15B.
Figure 20A:
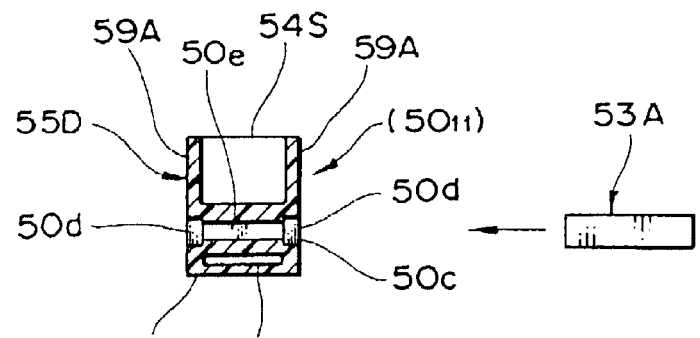
FIGS. 20A and 20B are a sectional view taken in line II—II in FIG. 19B before an unusual sound suppressing portion is attached to the harness supporting member and a sectional view taken in line II—II in FIG. 19B after the unusual sound suppressing portion has been attached to the harness supporting member, respectively.
Figure 20B:
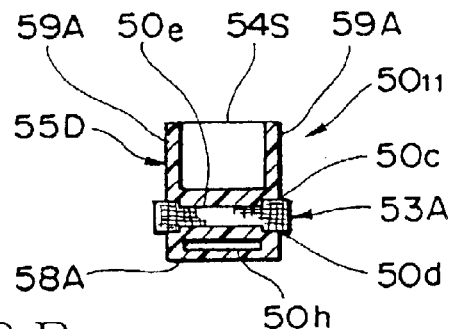
Figure 21:
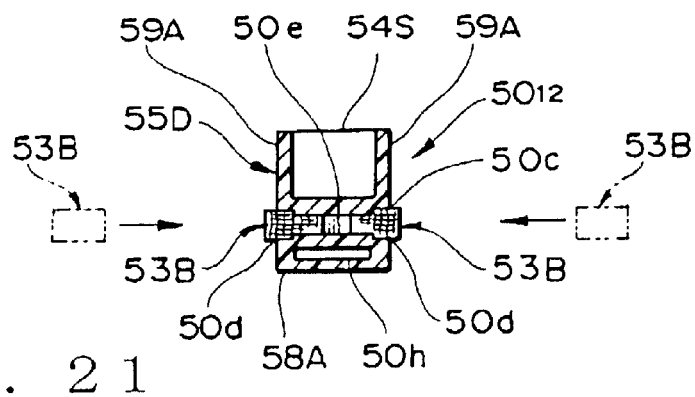
FIG. 21 is an explanation view of a harness supporting member used in a thirteenth embodiment of this invention.

The flat spring cap $50_1$ shown in FIG. 1 may be replaced by any one of those $50_4$ to $50_8$ shown in FIGS. 10 to 14, $50_9$, $50_{10}$ shown in FIGS. 15 to 17, and $50_{11}$, $50_{12}$ shown in FIGS. 19 to 21.

The supporting body 55A (FIG. 10), 55B (FIG. 15), 55C (FIG. 17), 55D (FIG. 19) includes a curved base wall 58A on which the wire harness 10A (FIGS. 10, 15 and 19) is placed, a pair of side walls 59A formed on both sides of the curved base wall 58A, an accommodating portion 54S in which the wire harness 10A (FIGS. 10, 15, 19) is accommodated, an attaching portion 50h (FIGS. 10, 15, 17, 19) in which the elastic member is inserted, and an engagement hole 50i which is to be engaged with the securing protrusion of the elastic member 40. The wire harness 10A is formed as a bundle of a plurality of cables 11 tied up by the corrugated tube 30A.

Embodiments 5 to 9

Referring to FIGS. 10 to 14, an explanation will be given of fifth to ninth embodiments of this invention.

In a state where the no vibration is applied, as seen from FIGS. 10 to 14, unusual sound suppressing portions are formed as ribs 52a to 52e of synthetic resin which are not in contact with the protector 70 (FIG. 10C). As seen from FIG. 10C, a protruding length Lb of the ribs 52a from the side wall 59A of the supporting body 55a is made shorter than a distance La from the side wall 59A to the protector body 80 of the protector 70 or the cover 90 thereof. The protruding length of each of the ribs 52b to 52e illustrated in FIGS. 11 to 14 is set at the same dimension as that of the rib 52a. The ribs 52b to 52e in FIGS. 10 to 14 are formed integrally to the supporting body 55A of the flat spring cap $50_4$ to $50_8$.

Where the ribs 52a to 52e are attached to the supporting body 55A, when the wire harness 10A and the supporting body 55a hit against the protector 70 owing the vibration applied to the wire harness 10A, the ribs 52a to 52e are first brought into contact with the protector 70 (FIG. 10C). This avoids the generation of loud unusual sound or hitting sound in a power supply apparatus for a sliding structure.

Figure 11:
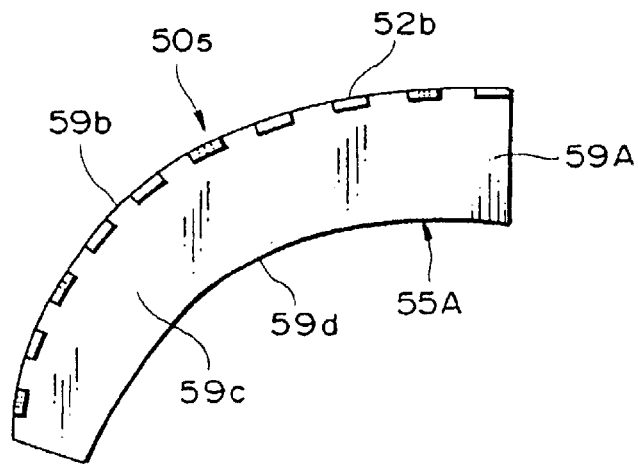
FIG. 11 is a bottom view of a harness supporting member used in a sixth embodiment of this invention.
Figure 12:
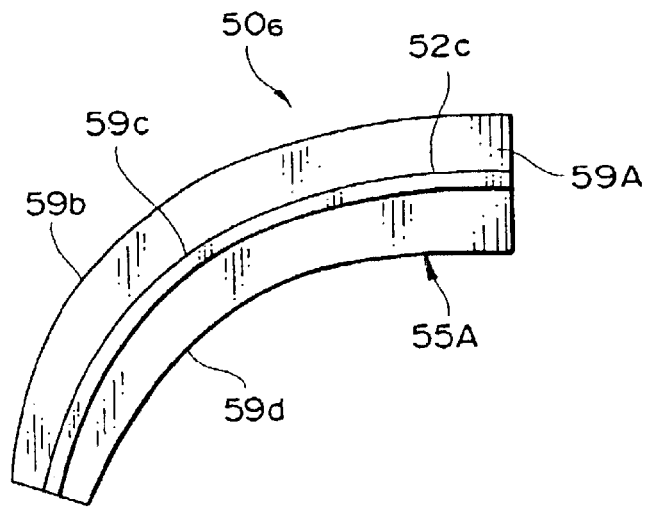
FIG. 12 is a bottom view of a harness supporting member used in a seventh embodiment of this invention.
Figure 13:
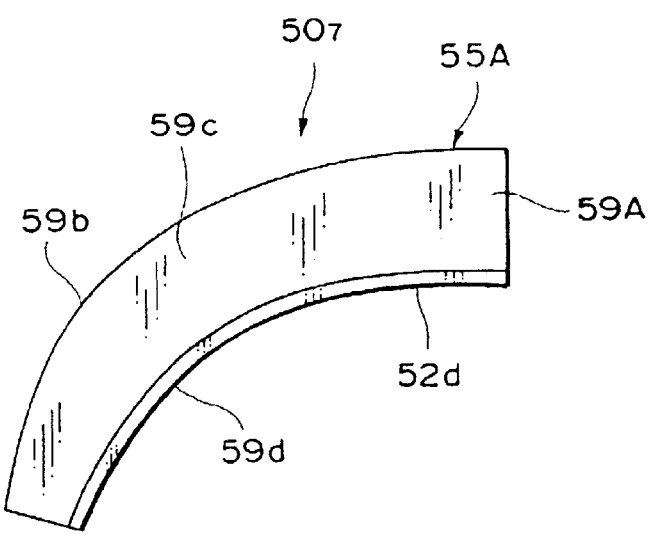
FIG. 13 is a bottom view of a harness supporting member used in an eighth embodiment of this invention.
Figure 14:
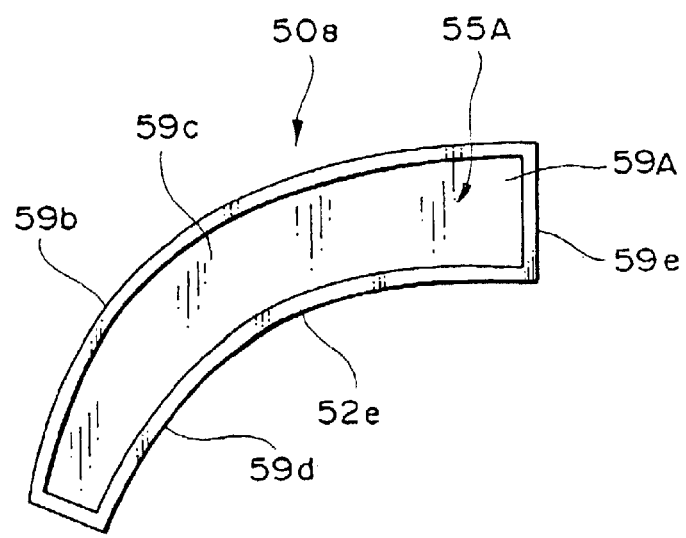
FIG. 14 is a bottom view of a harness supporting member used in a ninth embodiment of this invention.

In the fifth embodiment of this invention, as shown in FIG. 10B, the rib 52a are continuously formed on curved upper edges 59b of the side walls 59A of the supporting body 55A. In the sixth embodiment of this invention, as shown in FIG. 11, ribs 52b are formed at a plurality of positions of the curved upper edges 59b. In the seventh embodiment of this invention, as shown in FIG. 12, ribs 52c are integrally formed on the central positions of the side walls 59A. In the eighth embodiment of this invention, as shown in FIG. 13, ribs 52d are continuously formed on curved lower edges 59d of the side walls 59A of the supporting body 55A. In the ninth embodiment of this invention, as shown in FIG. 14, ribs 52e are continuously formed on the peripheries 59e of the side walls 59A. In this case, the rib 52 may be formed on the entire periphery of the supporting body 55A. Like the ribs 52b in FIG. 11, the ribs 52a, 52c to 52e may be divisionally formed at a plurality of positions (not shown).

Embodiments 10 and 11

Referring to FIGS. 15 to 18, an explanation will be given of a tenth and an eleventh embodiment of this invention. As seen from FIGS. 15 and 16, an unusual sound suppressing portion 52H includes rollable ball portions 52j which are in contact with the protector 70 and a coil spring 52m. Likewise, as seen from FIGS. 17 and 18, an unusual sound suppressing portion 52I includes rollable ball portions 52k which are to be in contact with the protector 70 and a coil spring 52m. The balls 52j, 52k are previously kept in contact with the protector 70 (FIG. 15C) ("zero-touch state").

The balls 52j and 52k each should not be limited to a real ball shape but may be composed of e.g. a spherical surface on one side which can reduce sliding resistance and a flat surface on the other side which can be surely pushed by the coil spring.

Where the unusual sound suppressing portion 52H, 52I is attached to the supporting body 55B, 55C, when the wire harness 10A and the supporting body 55B, 55C hit against the protector 70 owing the vibration applied to the wire harness 10A, the coil spring 52m, 52n pushes the balls 52j, 52k to absorb the vibration. This suppresses the generation of loud unusual sound or hitting sound in a power supply apparatus for a sliding structure.

The above unusual sound suppressing portion 52H, 52I may be provided at not only the position as illustrated but at any position of the side walls 59A, and also plural unusual sound suppressing portions may be provided on each side wall 59A.

In the tenth embodiment of this invention, as seen from FIG. 16, the two balls 52j are forcibly fit in both openings 50k of a cylindrical hole portion 50j made in the supporting body 55B. The pair of balls 52j are placed in the state where they are pushed outwardly by the elastic force of the coil spring 52m which is located between the pair of balls 52j and compressed.

Figure 18A:
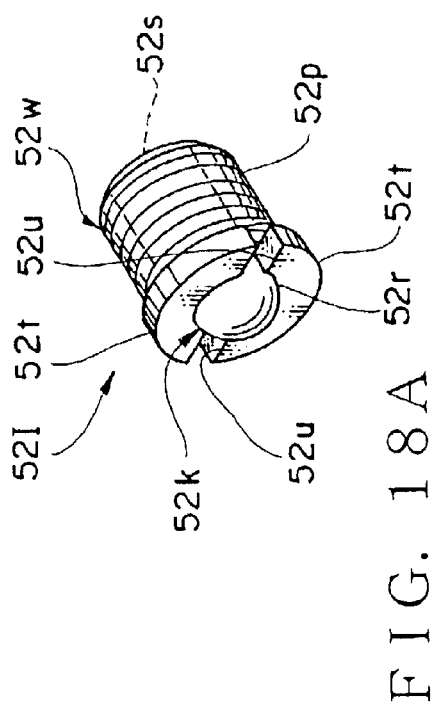
FIGS. 18A, 18B and 18C are a perspective view of an unusual sound suppressing portion used in the eleventh embodiment of this invention, a front view thereof, and an explanation view thereof which shows a partially recessed state, respectively.
Figure 18C:
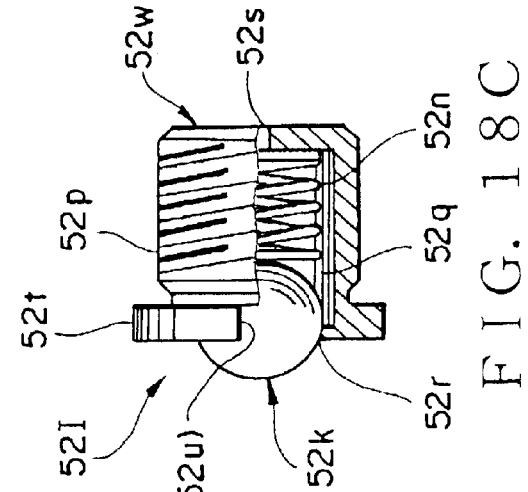
Figure 18B:
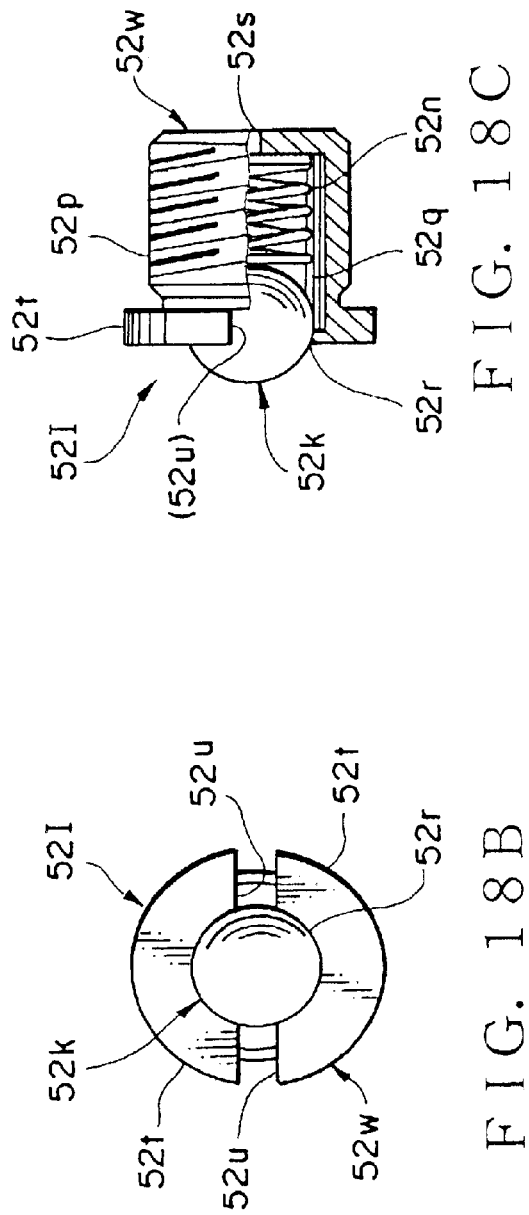

In the eleventh embodiment of this invention shown in FIGS. 17 and 18, as seen from FIG. 18, the unusual sound suppressing portion 52I is a ball plunger which includes a rollable ball 52k, a coil spring 52n which pushes the ball 52k toward a plunger body 52w by restoring elastic force, and the plunger body 52w which houses the coil spring 52n in an accommodating portion 52q and holds the ball 52k forcibly fit in an opening 52r to give restoring elastic force to the compressed coil spring 52n.

As seen from FIG. 18, the plunger body 52w includes a male screw 52P, a jig groove 52u, a flange 52t and 52s. The male screw 52p is screwed with a female screw 50p of the supporting body 55C of the flat spring cap $50_{10}$ (FIG. 17). The jig groove 52u permits the ball plunger 52I to be rotatable with the aid of jig such as a wrench when the male screw 52p is screwed with the female screw 50p (FIG. 17). The flange 52t is to be brought into contact with the side wall 59A of the supporting body 55C. The through-hole 52s serves to discharge the air in the accommodating portion 52q when the ball 52k is pushed into the accommodating portion 52q of the plunger body 52w. The male screw 52p of the ball plunger 52I may be replaced by a cylinder for fitting and correspondingly, the female screw 50p may be a hole for fitting. An example of the ball plunger is commercially available from TAKAI Corporation as a "flange-equipped ball plunger" (brand name).

The unusual sound suppressing portions 52H (FIGS. 15 and 16) and 52I (FIGS. 17 and 18) each may be equipped with a locking-equipped cover (not shown). In this case, using the locking-equipped cover, the ball 52j (FIGS. 15 and 16), 52k (FIGS. 17 and 18) is combined with the unusual sound suppressing portion 52H (FIGS. 15 and 16), 52I (FIGS. 17 and 18).

The ribs 52a to 52e (FIGS. 10 to 14) each has a layer of a applied material containing molybdenum disulfide and excellent contact capability. The flexible blades $51_1$, $51_2$, ribs 52 (FIGS. 5 to 7) and balls 52j (FIGS. 15 and 16), 52k may also have such a layer. The applied material with excellent contact capability may be fluororesin as well as molybdenum disulfide. An example of the material containing molybdenum disulfide is commercially available from TOYO DRYLOOP Corp. as a "molybdenum disulfide system dry loop" (brand name).

Even when the wire harness 10A and supporting body 55, 55A, 55B, 55C hit against the protector 70 owing the vibration applied to the wire harness 10A, the provision of the layer having excellent contact capability in the unusual sound suppressing portion will suppress generation of loud unusual sound or hitting sound from the power supply apparatus for a sliding structure.

It should be noted that the inner walls 84, 94 of the protector body 80 and cover 90 (FIG. 10) are mirror-finished in order to improve the sliding capability for the ribs 52a to 52e (FIGS. 10 to 14) and balls 52j (FIGS. 15 and 16) and 52k (FIGS. 17 and 18).

The mirror-finished state, when the protector body 80 or cover 90 is formed by injection molding, can be realized by duplication of the mold for injection molding (not shown) whose molding face corresponding to the inner face 84 or 94 of the protector body 80 or cover 90 is mirror-finished.

Where the inner faces 84 and 94 are mirror-finished according to the specification of the slide door, the layer of the applied material with excellent contact capability may be omitted in the flexible blades $51_1$, $51_2$ (FIGS. 1 to 4), ribs (FIGS. 5 to 7), 52a to 52e (FIGS. 10 to 14), and balls 52j (FIGS. 15 and 16) and 52k (FIGS. 17 and 18).

Embodiments 12 and 13

Referring to FIGS. 19 to 21, an explanation will be given of a twelfth and thirteenth embodiments of this invention. As an unusual sound suppressing portion 53A (FIGS. 19 and 20), 53B (FIG. 21), the supporting body 55D of a flat spring cap $50_{11}$ (FIGS. 19 and 20), $50_{12}$ (FIG. 21) is provided with an unusual sound absorbing member 53A (FIGS. 19, 20), 53B (FIG. 21) of felt which is to be in contact with the protector 70 (FIG. 19C).

In the twelfth embodiment, as seen from FIGS. 19 and 20, the unusual sound absorbing member 53A is a long square member of felt. In the thirteenth embodiment, as seen from FIG. 21, the unusual sound absorbing member 53B is a short square member of felt.

Since the flat spring cap $50_{11}$, $50_{12}$ is provided with the unusual sound absorbing member 53A, 53B which is brought into contact with the protector 70, the unusual sound generated when the main portion of the flat spring cap $50_{11}$, $50_{12}$ hits against the protector 70 is suppressed. Even when the wire harness 10A and flat spring cap $50_{11}$, $50_{12}$ hit against the protector 70 owing the vibration applied to the wire harness 10A, the unusual sound absorbing member 53A, 53B absorbs the vibration to avoid generation of loud unusual sound or hitting sound from the power supply apparatus for a sliding structure.

As seen from FIGS. 19 to 21, the supporting body 55D has an attaching hole 50c into which the unusual sound absorbing member 53A, 53B can be inserted.

By inserting the unusual sound absorbing member 53A, 53B into the attaching hole 50c, the unusual sound absorbing member 53A, 53B can be easily attached to the supporting body 55D.

As seen from FIGS. 20 and 21, each of the inlets 50d of the attaching hole 50c substantially corresponds to the external shape of the unusual sound absorbing member 53A, 53B. The central portion 50e of the attaching hole 50c has a smaller size than that of the outer size of the unusual sound absorbing member 53A, 53B.

Where the attaching hole 50c is formed to have such a shape, the unusual sound absorbing member 53A, 53B which is made of soft felt material is pressed into the central portion 50e made in the flat spring cap $50_{11}$, $50_{12}$. Thus, the unusual sound absorbing member 53A, 53B can be surely held in the flat spring cap $50_{11}$, $50_{12}$.

As seen from FIG. 19B, an attaching piece (s) 51b is formed to protrude from the bass wall 58A or side wall 59A of the supporting body 59D. The attaching piece 51b has an attaching hole 51c into which the unusual sound absorbing member 53A (FIG. 20) or 53B (FIG. 21) can be inserted. A plurality of absorbing members of felt 53A or 53B may be attached to the attaching pieces 51b (FIG. 19B).

Since the supporting body 55D of the flat spring cap $50_{11}$ is provided with the plurality of unusual sound absorbing members 53A, 53B, even when severe vibration is applied to the protector 70 (FIG. 19C) or the flat spring cap $50_{11}$, the generation of the unusual sound when the supporting body 55D hits against the protector 70 (FIG. 19C) can be surely avoided.

Embodiment 14

Figure 23A:
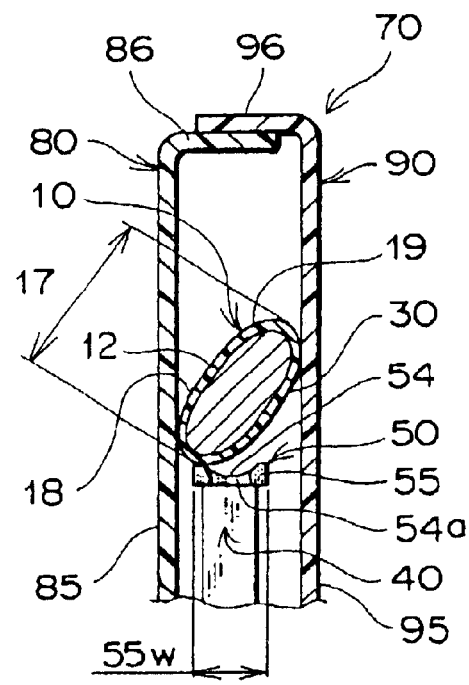
FIGS. 23A and 23B are a front view showing the state when the sliding structure is closed for a car body and a front view showing the state when a sliding structure is opened for the car body in a power supply apparatus for the sliding structure shown in FIG. 22.
Figure 23B:
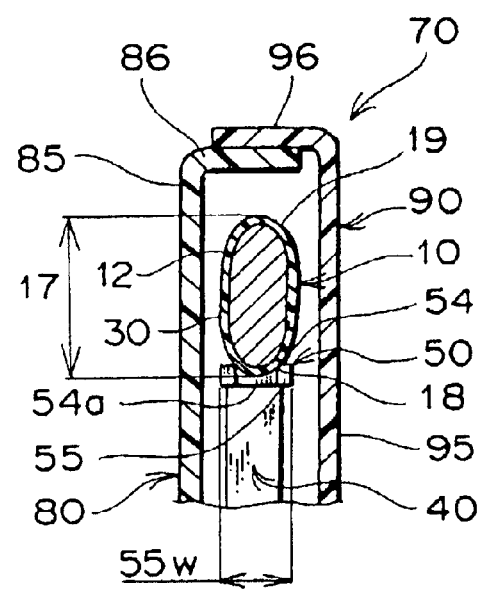

In an fourteenth embodiment of this invention, as seen from FIG. 23, the supporting body 55 has a curved concave groove 54 which corresponds to the door side harness 10 covered with a tube member 30 having an elliptical shape in section. The width of the supporting body 55 is shorter than the longer diameter of the door side wire harness 10. The one end 18 of the door side wire harness 10 in the longitudinal direction and the other end 19 thereof serve as unusual sound suppressing portions.

Figure 22A:
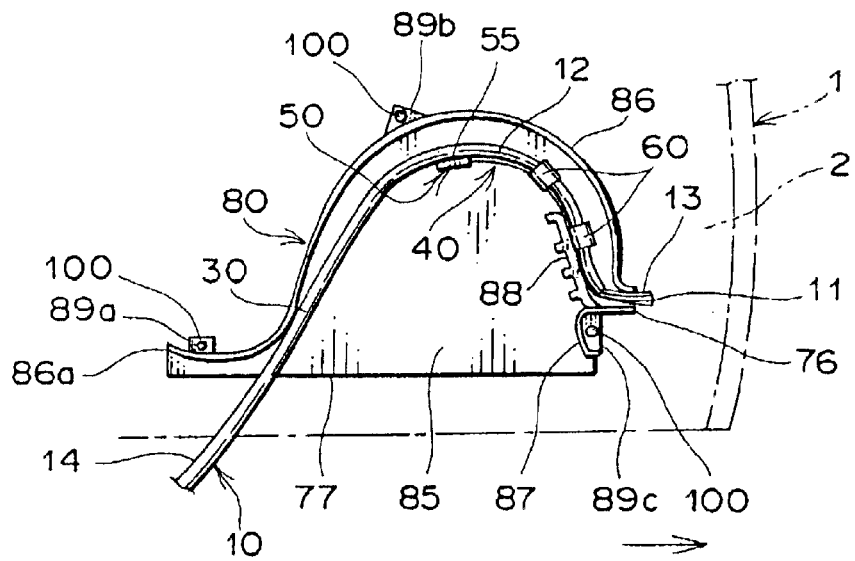
FIGS. 22A and 22B are a front view showing the state when the sliding structure is closed for a car body and a front view showing the state when a sliding structure is opened for the car body in a power supply apparatus for the sliding structure in a fourteenth embodiment of this invention.
Figure 22B:
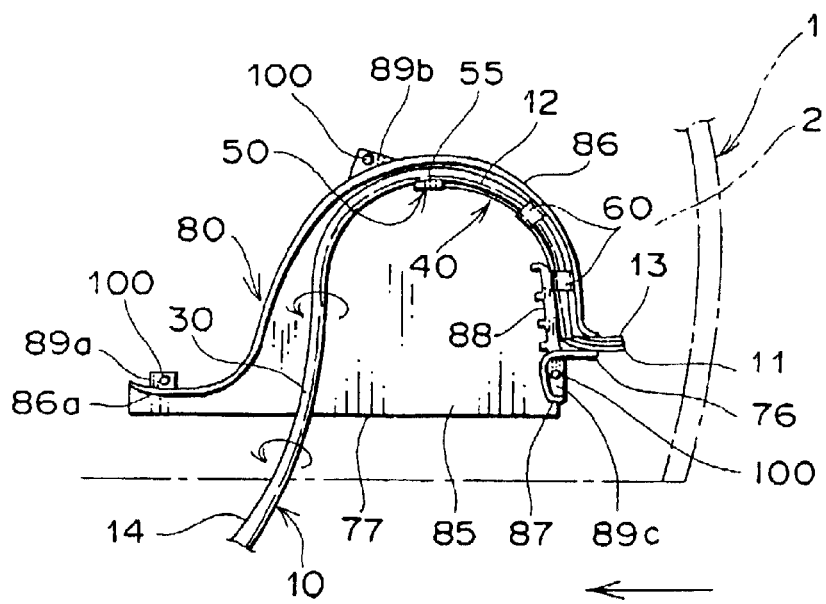

As seen from FIGS. 22A and 23A, in a state where the slide door 1 is closed for the car body, the door side wire harness 10 is twisted so that the door side wire harness 10 placed on the curved convex groove 54 is tilted. In this case, the one end 18 of the door side harness 10 is brought into contact with the substrate 85 of the protector body 80, and simultaneously the other end 19 thereof is brought into contact with the substrate 95 of the cover 95.

In short, the door side wire harness 10 covered with the tube 30 is caused to interfere with the substrate 85 of the protector body 80 and the substrate 95 of the cover 90.

In this state, since the width 55w of the supporting body 55 is shorter than the longer diameter 17 of the door side wire harness 10, the generation of the unusual sound when the supporting body 55 hits against the substrate 95 of the cover will be suppressed.

A tilting promoting portion such as a rib (not shown) may be attached to the flat spring cap, protector body or cover in order to tilt the door side wire harness 10 actively when the slide door is closed for the car body.

As seen from FIGS. 24 to 28, a protector $70_1$ to $70_3$ includes a protector body of synthetic resin $80_1$ to $80_3$, which is attached to the slide door 1, and a cover $90_1$ to $90_3$ of synthetic resin, which is engaged with the protector body $80_1$ to $80_3$ in a state where the curved portion 12 of the door side wire harness 10 is accommodated.

Figure 26A:
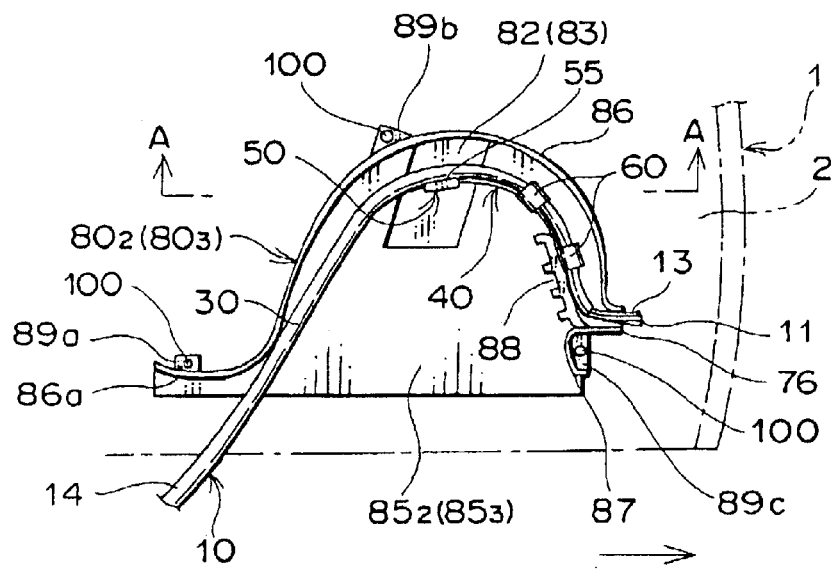
FIGS. 26A and 26B are a front view showing the state when the sliding structure is closed for a car body and a front view showing the state when a sliding structure is opened for the car body in a power supply apparatus for the sliding structure according to sixteenth and seventeenth embodiments.

As seen from FIGS. 24A and 26A, in a state where the slide door 1 is closed for the car body, an unusual sound suppressing portion 81 to 83 (FIGS. 24 to 28), 91 to 93 (FIGS. 25, 27, 28) which corresponds to the flat spring cap 50, is formed on the substrate $85_1$ to $85_3$ of a protector body $80_1$ to $80_3$ and the substrate $95_1$ to $95_3$ of a cover $90_1$ to $90_3$. As shown, the unusual sound suppressing portion 81 to 83, 91 to 93 are served as relief portions which avoids contact with the flat spring cap 50.

Since the above unusual sound suppressing portion 81 to 83, 91 to 93 is formed on the substrate $85_1$ to $85_3$ and $95_1$ to $95_3$ on which the flat spring cap 50 is located when the slide door is closed for the car body, the unusual sound generated when the flat spring cap 50 hits against the protector body $80_1$ to $80_3$ and the cover $90_1$ to $90_3$ can be suppressed.

Embodiment 15

In a fifteenth embodiment of this invention of this invention as shown in FIGS. 24 and 25, through-holes 81 and 91, which are square windows and serves as the unusual sound suppressing portions, are formed in the substrates $85_1$ of the protector body $80_1$ and $95_1$ of the cover $90_1$.

Since the through-holes 81 and 91 are formed so as to correspond to the supporting body 55 on the substrates $85_1$ and $95_1$ on which the flat spring cap 50 is located when the slide door 1 is closed for the car body, the flat spring cap 50 does not hit against the substrates $85_1$ and $95_1$. Therefore, the unusual sound generated when the flat spring cap 50 hits against the protector body $80_1$ and the cover $90_1$ can be surely suppressed.

Embodiment 16

Figure 26B:
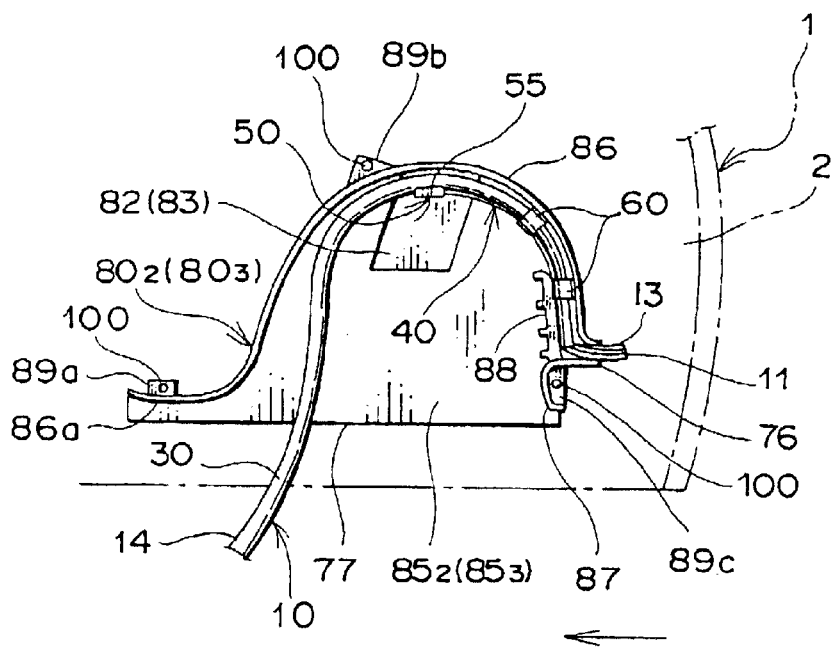
Figure 27:
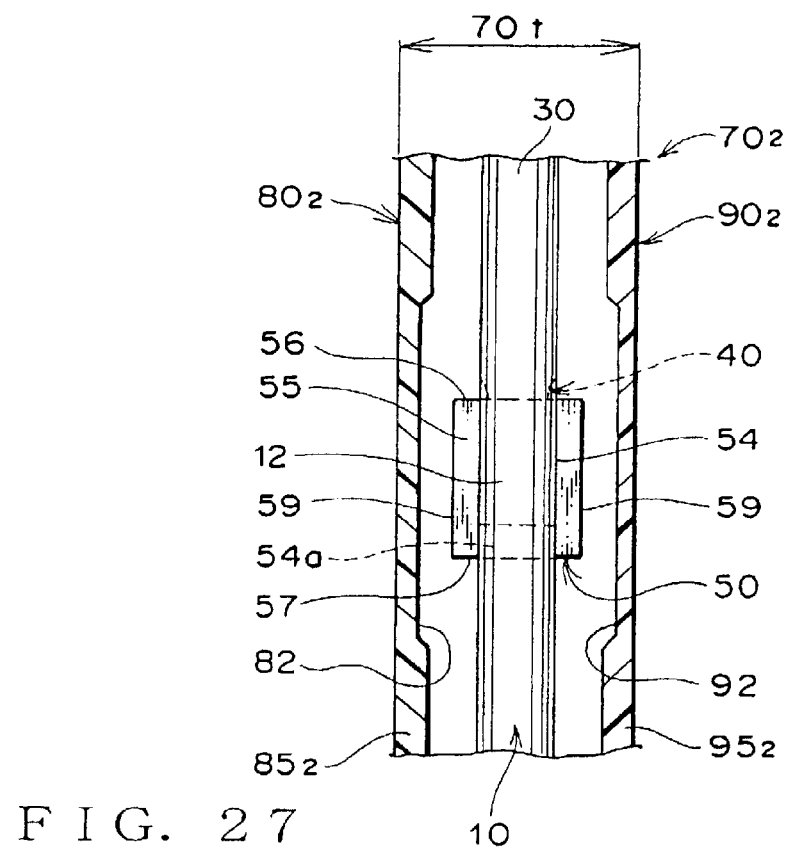
FIG. 27 is a sectional view taken in line A—A in FIG. 26A in the sixteenth embodiment.
Figure 28:
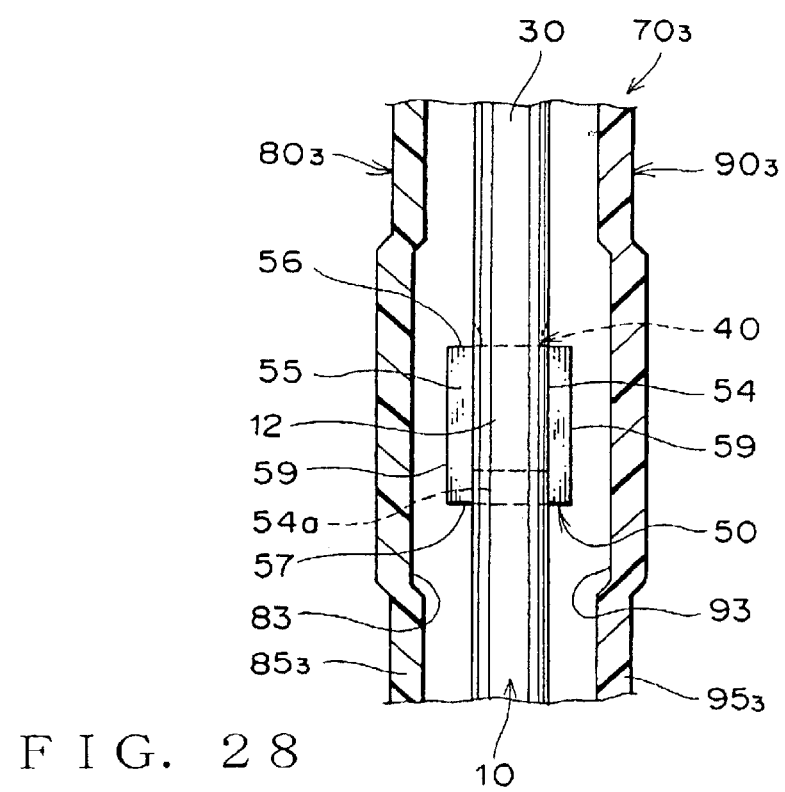
FIG. 28 is a sectional view taken in line A—A in FIG. 26A in the seventeenth embodiment.

In a sixteenth embodiment of this invention shown in FIGS. 26 and 27, concave portions 82 and 92 are formed on the substrate $85_2$ of the protector body $80_2$ and the substrate $95_2$ of the cover $90_2$. In FIG. 26, reference numeral 82 denotes a concave portion which is a thin portion formed by denting the inner wall of the substrate $85_2$ and reference numeral 83 denotes a relief groove. However, in FIG. 26, for convenience of illustration, both are shown as the same element.

Since the concave portions 82 and 92 are formed so as to correspond to the supporting body 55 on the substrates $85_1$ and $95_1$ on which the flat spring cap 50 is located when the slide door 1 is closed for the car body, the unusual sound generated when the flat spring cap 50 hits against the protector body $80_1$ and the cover $90_1$ can be surely suppressed.

In a state where a cover $90_2$ has been combined with a protector body $80_2$, the thickness $70t$ of a protector $70_2$ from the outer face of the substrate $85_2$ of the protector body $80_2$ to the outer face of the substrate $95_2$ of the cover $90_2$ is fixed irrespectively of the presence or absence of the concave portion 82, 92. Therefore, the protector does not interfere with the convex portion (not shown) within the slide door 1 so that its design can be easily changed.

Embodiment 17

In a seventeenth embodiment of this invention as shown in FIGS. 26 and 28, relief grooves 83 and 93 are formed in the substrate $85_3$ of the protector body $80_3$ and the substrate $95_3$ of the cover $90_3$, respectively.

Since the relief grooves 83 and 93 which are square are formed so as to correspond to the supporting body 55 on the substrates $85_3$ and $95_3$ on which the flat spring cap 50 is located when the slide door 1 is closed for the car body, the unusual sound generated when the flat spring cap 50 hits against the substrate $85_3$ and $95_3$ can be surely suppressed. In addition, since the relief grooves 83 and 93 are not made thin, the strength of the protector body $80_3$ and the cover $90_3$ can be reduced.

Further, in the state where the slide door has been closed for the car body, in place of the relief groove 81 which avoids contact with the flat spring cap 50, a projection (not shown) to be in contact with the flat spring cap 50 may be attached to the substrates $85_1$ and $95_1$ on which the flat spring cap 50 is located. Namely, in the above state, the accommodating portion of the protector may have a narrow width portion.

Where such a projection to be in contact with the flat spring cap 50 is provided, the flat spring cap 50 is fit into the projection so that the generation of the unusual sound due to vibration can be avoided.

What is claimed is:

1. A power supply apparatus for a sliding structure comprising:
   a wire harness extended from a main body to a sliding structure;
   an elastic member for urging said wire harness in a warp absorbing direction;
   a harness supporting member mounted on the elastic member, on which the wire harness is placed;

a curved portion protecting member which movably accommodates a curved portion of the wire harness at an intermediate position in a longitudinal direction thereof; and an unusual sound suppressing portion for preventing unusual sound from being generated when the harness supporting member hits against the curved portion protecting member.

2. A power supply apparatus for a sliding structure according to claim 1, wherein said harness supporting member is provided with a projecting portion to be in contact with said curved portion protecting member, said projection serving as said unusual sound suppressing portion.

3. A power supply apparatus for a sliding structure according to claim 2, wherein said projecting portion is composed of flexible blades which are projected from both ends of said harness supporting member.

4. A power supply apparatus for a sliding structure according to claim 2, wherein said projecting portion is composed of ribs projected from both sides of said harness supporting member.

5. A power supply apparatus for a sliding structure according to claim 2, wherein said elastic member is provided with a projecting portion to be in contact with said curved portion protecting member, said projection serving as said unusual sound suppressing portion.

6. A power supply apparatus for a sliding structure according to claim 4, wherein said ribs are not in contact with said curved portion protecting member in a state where no vibration is applied to the power supply apparatus.

7. A power supply apparatus for a sliding structure according to claim 1, wherein said unusual sound suppressing portion is composed of a ball portion which is to be brought in contact with said curved portion protecting member and an urging member for urging the said ball portion toward said curved portion protecting member.

8. A power supply apparatus for a sliding structure according to claim 1, wherein said unusual sound suppressing portion is covered with an applied material with adhesiveness.

9. A power supply apparatus for a sliding structure according to claim 1, wherein a soft member to hit against said curved portion protecting member is attached to said elastic member, said soft member serving as said unusual sound generating portion.

10. A power supply apparatus for a sliding structure according to claim 1, wherein a soft material to hit against said curved portion protecting member is attached to said wire harness, said soft member serving as said unusual sound generating portion.

11. A power supply apparatus for a sliding structure according to claim 1, wherein an unusual sound absorbing member to hit against said curved portion protecting member is attached to said harness supporting member, said unusual sound absorbing member serving as the said unusual sound generating portion.

12. A power supply apparatus for a sliding structure according to claim 1, wherein said harness supporting member has an attaching hole to which said unusual sound absorbing member is inserted.

13. A power supply apparatus for a sliding structure according to claim 12, wherein each of the inlets of the attaching hole substantially corresponds to the external shape of the unusual sound absorbing member, and the central portion of said attaching hole has a smaller size than that of the outer size of the unusual sound absorbing member.

14. A power supply apparatus for a sliding structure according to claim 11, wherein said unusual sound absorbing member is one of a plurality of unusual sound absorbing members attached to said harness supporting member.

15. A power supply apparatus for a sliding structure according to claim 1, wherein the width of a body of said harness supporting member is shorter than the longer diameter of said wire harness which is elliptical in section so that the one end of said wire harness in the longitudinal direction and the other end thereof serve as unusual sound suppressing portions; and in a state where said sliding structure is closed for a said main body, the wire harness is twisted so that the wire harness placed on said body of the harness supporting member is tilted and then the one and other ends of said wire harness are brought into contact with substrates of said curved portion protecting member.

16. A power supply apparatus for a sliding structure according to claim 1, wherein said unusual sound suppressing portion which corresponds to said harness supporting member is formed on a substrate of said curved portion protecting member so as to serve as a relief portion which avoids contact with said harness supporting member.

17. A power supply apparatus for a sliding structure according to claim 16, wherein said relief portion is a through-hole formed in each substrate.

18. A power supply apparatus for a sliding structure according to claim 16, wherein said relief portion is a concave portion or relief groove formed on each substrate.

19. A power supply apparatus for a sliding structure according to claim 16, wherein in place of said relief portion, a projection to be in contact with said harness supporting member is attached to each substrate of said curved portion protecting portion.

* * * * *